United States Patent
Sawada et al.

(10) Patent No.: US 10,035,430 B2
(45) Date of Patent: Jul. 31, 2018

(54) CONTROL DEVICE FOR ELECTRIC MOTOR VEHICLE AND CONTROL METHOD FOR ELECTRIC MOTOR VEHICLE

(71) Applicant: NISSAN MOTOR CO., LTD., Yokohama-shi, Kanagawa (JP)

(72) Inventors: Akira Sawada, Kanagawa (JP); Ken Ito, Kanagawa (JP); Takashi Nakajima, Kanagawa (JP); Yuji Katsumata, Kanagawa (JP); Hiroyuki Komatsu, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/546,187

(22) PCT Filed: Jan. 26, 2015

(86) PCT No.: PCT/JP2015/052081
§ 371 (c)(1),
(2) Date: Jul. 25, 2017

(87) PCT Pub. No.: WO2016/120979
PCT Pub. Date: Aug. 4, 2016

(65) Prior Publication Data
US 2018/0043792 A1    Feb. 15, 2018

(51) Int. Cl.
*B60L 15/20*    (2006.01)

(52) U.S. Cl.
CPC ........... *B60L 15/20* (2013.01); *B60L 2240/12* (2013.01); *B60L 2240/421* (2013.01); *B60L 2240/423* (2013.01); *B60L 2250/28* (2013.01)

(58) Field of Classification Search
CPC .............. B60L 15/20; B60L 2240/421; B60L 2240/423; B60L 2250/28; B60L 2240/12
See application file for complete search history.

(56) References Cited

U.S. PATENT DOCUMENTS

| | | |
|---|---|---|
| 2002/0190683 A1 | 12/2002 | Karikomi et al. |
| 2005/0017580 A1 | 1/2005 | Cikanek et al. |

(Continued)

FOREIGN PATENT DOCUMENTS

| | | |
|---|---|---|
| EP | 2 581 259 A1 | 4/2013 |
| EP | 2 810 811 A1 | 12/2014 |

(Continued)

*Primary Examiner* — Yuen H Wong
(74) *Attorney, Agent, or Firm* — Foley & Lardner LLP

(57) ABSTRACT

A control device for electric motor vehicle using the motor as the traveling driving source and configured to decelerate by a regenerative braking force from the motor detects the accelerator operation amount, calculates the disturbance torque estimated value, and detects or estimates the resistance component unrelated to the gradient from the vehicle state. The control device for electric motor vehicle corrects the disturbance torque estimated value according to the detected or estimated resistance component unrelated to the gradient. The motor is controlled on the basis of the motor torque command value. When the accelerator operation amount is equal to or less than the predetermined value and the electric motor vehicle is just before the stop of the vehicle, the motor torque command value converges to the corrected disturbance torque estimated value in conjunction with the reduction of the rotation speed of the motor.

9 Claims, 19 Drawing Sheets

(56) References Cited

U.S. PATENT DOCUMENTS

| | | | |
|---|---|---|---|
| 2005/0187671 A1* | 8/2005 | Nada | B60K 6/365 |
| | | | 701/1 |
| 2010/0299011 A1 | 11/2010 | Fujimoto et al. | |
| 2013/0116874 A1 | 5/2013 | Ichinose et al. | |
| 2014/0379190 A1 | 12/2014 | Sawada | |
| 2015/0127202 A1 | 5/2015 | Itou | |

FOREIGN PATENT DOCUMENTS

| | | |
|---|---|---|
| GB | 2474934 A | 5/2011 |
| JP | 8-79907 A | 3/1996 |
| JP | 2001-045613 A | 2/2001 |
| JP | 2002-152916 A | 5/2002 |
| JP | 2003-9566 A | 1/2003 |
| JP | 2010-200587 A | 9/2010 |
| JP | 2010-288332 A | 12/2010 |
| JP | 2011-87364 A | 4/2011 |
| JP | 2012-091603 A | 5/2012 |
| WO | WO-2013/157314 A1 | 10/2013 |

* cited by examiner

CONTROL DEVICE FOR ELECTRIC MOTOR VEHICLE AND CONTROL METHOD FOR ELECTRIC MOTOR VEHICLE

TECHNICAL FIELD

The present invention relates to a control device for electric motor vehicle and a control method for electric motor vehicle.

BACKGROUND ART

Conventionally, a regenerative brake control device for electric vehicles provided with setting means capable of any given setting of a regenerative braking force of a motor and regenerates the motor by a regenerative braking force set by the setting means is known (see JP8-79907A).

SUMMARY OF INVENTION

However, the technique in JP8-79907A has the following problem. If the regenerative braking force set by the setting means is large, vibration in a longitudinal direction of a vehicle body may be generated when the electric vehicle is decelerated by the set regenerative braking force and the speed becomes 0.

An object of the present invention is to provide a technique that reduces the generation of vibration in a longitudinal direction of a vehicle body in stopping an electric motor vehicle with a regenerative braking force.

A device for controlling an electric vehicle according to an embodiment is that a control device for electric motor vehicle using the motor as the traveling driving source and configured to decelerate by a regenerative braking force from the motor detects the accelerator operation amount, calculates the disturbance torque estimated value, and detects or estimates the resistance component unrelated to the gradient from the vehicle state. The control device for electric motor vehicle corrects the disturbance torque estimated value according to the detected or estimated resistance component unrelated to the gradient. The motor is controlled on the basis of the motor torque command value. When the accelerator operation amount is equal to or less than the predetermined value and the electric motor vehicle is just before the stop of the vehicle, the motor torque command value converges to the corrected disturbance torque estimated value in conjunction with the reduction of the rotation speed of the motor.

Embodiments of the present invention and merits of the present invention will be described below in detail together with the attached drawings.

DESCRIPTION OF EMBODIMENTS

First Embodiment

Figure 1:
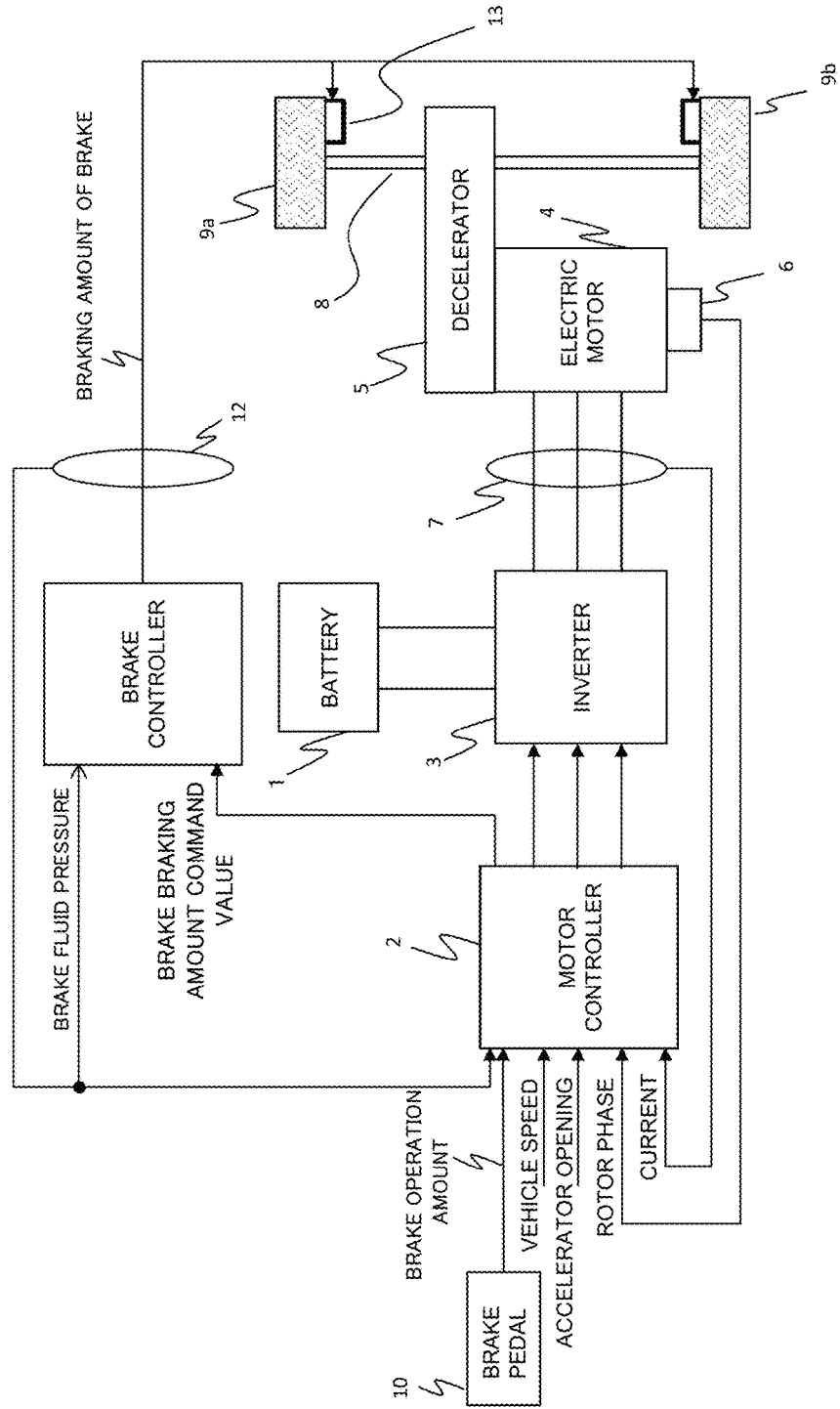
FIG. 1 is a block diagram illustrating a main configuration of an electric vehicle with a control device for electric motor vehicle of a first embodiment.

FIG. 1 is a block diagram illustrating a main configuration of an electric vehicle with a control device for electric motor vehicle of the first embodiment. The control device for electric motor vehicle of the present invention includes an electric motor 4 as part or the entirety of a drive source of the vehicle and is applicable to an electric motor vehicle capable of traveling by a drive force of the electric motor. Electric motor vehicles include not only electric vehicles, but also hybrid vehicles and fuel cell vehicles. Particularly, the control device for electric motor vehicle according to the embodiment can be applied to a vehicle capable of controlling acceleration/deceleration and a stop of the vehicle only by an operation of an accelerator pedal. In this vehicle, a driver depresses the accelerator pedal during acceleration and reduces or zeros a depression amount of the depressed accelerator pedal during deceleration or during stop. It should be noted that, the vehicle approaches the stop state while the driver depresses the accelerator pedal to prevent the vehicle from retreating on uphill roads in some cases.

A motor controller 2 has signals indicating vehicle states such as a vehicle speed V, an accelerator position AP, a rotator phase α of the electric motor (three-phase alternating current motor) 4 and currents iu, iv, and iw of the electric motor 4, which are input to the motor controller 2 in the form of digital signals, and generates PWM signals for controlling the electric motor 4 based on the input signals. The motor controller 2 performs an open/close control of a switching element of an inverter 3 by the generated PWM signal. The motor controller 2 has functions as disturbance torque estimating means, motor torque command value calculation means, motor control means, and brake torque estimating means. The disturbance torque estimating means estimates a disturbance torque, which will be described later. The motor torque command value calculation means calculates a motor torque command value, which will be described later. The motor control means controls the electric motor 4 based on the motor torque command value. The brake torque estimating means calculates a brake torque estimated value, which will be described later.

The inverter 3 turns on/off, for example, two switching elements (for example, power semiconductor elements such as IGBTs and MOS-FETs) for each phase to convert a direct current supplied from a battery 1 into an alternating current and causes a desired current to flow into the electric motor 4.

The electric motor 4 generates a drive force by the alternating current supplied from the inverter 3 and transmits the drive force to right and left drive wheels 9a, 9b via a speed reducer 5 and a drive shaft 8. Further, when being rotated following the drive wheels 9a, 9b during the travel of the vehicle, the electric motor 4 generates a regenerative drive force, thereby collecting the kinetic energy of the vehicle as electrical energy. In this case, the inverter 3 converts an alternating current generated during the regenerative operation of the electric motor 4 into a direct current and supplies the direct current to the battery 1.

A current sensor 7 detects the three-phase alternating currents iu, iv and iw flowing in the electric motor 4. Note that, since the sum of the three-phase alternating currents iu, iv and iw is 0, the currents of any of two phases may be detected and the current of the remaining one phase may be obtained by calculation.

A rotation sensor 6 is, for example, a resolver or an encoder and detects the rotator phase $\alpha$ of the electric motor 4.

A brake controller 11 sets a braking amount B according to the depression amount of a brake pedal 10 to control a brake fluid pressure according to the braking amount B.

A fluid pressure sensor 12 functions as brake operation amount detecting means and detects the brake fluid pressure to obtain the braking amount B and outputs the obtained braking amount B to the motor controller 2.

A friction brake 13 presses a brake pad to a rotor according to the brake fluid pressure, thus generating a braking force in the vehicle.

Figure 2:
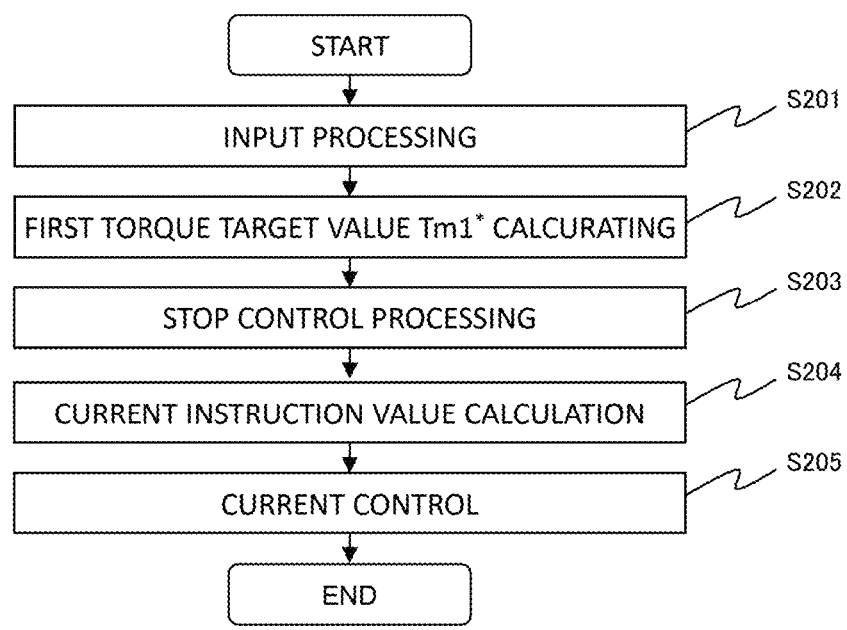
FIG. 2 is a flow of processes for a motor current control performed by a motor controller provided with the control device for electric motor vehicle of the first embodiment.

FIG. 2 is a flowchart showing a flow of processes for a motor current control performed by the motor controller 2.

In Step S201, signals indicating the vehicle states are input. Here, the vehicle speed V (km/h), the accelerator position AP (%), the rotator phase $\alpha$ (rad) of the electric motor 4, a rotation speed Nm (rpm) of the electric motor 4, the three-phase alternating currents iu, iv and iw flowing in the electric motor 4, a direct-current voltage value Vdc (V) between the battery 1 and the inverter 3, and the braking amount B are input.

The vehicle speed V (km/h) is obtained by a vehicle speed sensor or through communications from another controller (not illustrated).

Alternatively, the vehicle speed v (m/s) is obtained by multiplying a rotator mechanical angular velocity $\omega m$ by a tire dynamic radius R and dividing the product by a gear ratio of a final gear, and then the obtained value is multiplied by 3600/1000 for unit conversion, thereby obtaining the vehicle speed V (km/h).

The accelerator position AP (%) is obtained from an accelerator position (not illustrated) or through communications from another controller such as a vehicle controller (not illustrated).

The rotator phase $\alpha$ (rad) of the electric motor 4 is obtained from the rotation sensor 6. The rotation speed Nm (rpm) of the electric motor 4 is obtained by dividing a rotator angular velocity $\omega$ (electric angle) by a pole pair number p of the electric motor 4 to obtain a motor rotation speed $\omega m$ (rad/s), which is a mechanical angular velocity of the electric motor 4, and multiplying the obtained motor rotation speed $\omega m$ by 60/(2 $\pi$). The rotator angular velocity $\omega$ is obtained by differentiating the rotator phase $\alpha$.

The currents iu, iv and iw (A) flowing in the electric motor 4 are obtained from the current sensor 7.

The direct-current voltage value Vdc (V) is obtained from a voltage sensor (not illustrated) provided in a direct-current power supply line between the battery 1 and the inverter 3 or a power supply voltage value transmitted from a battery controller (not illustrated).

The braking amount B is obtained from the fluid pressure sensor 12, which detects the brake fluid pressure. A value of, for example, a stroke sensor (not illustrated), which detects a brake operation amount by the driver, may be used. Alternatively, a brake command value may be obtained from the vehicle controller and another controller (not illustrated) through communications to set the brake command value as the braking amount B. When the braking amount B is set from the sensor value or the command value, responsiveness from when the braking amount B is input to the vehicle until the braking force actually acts on the vehicle is taken into consideration.

Figure 3:
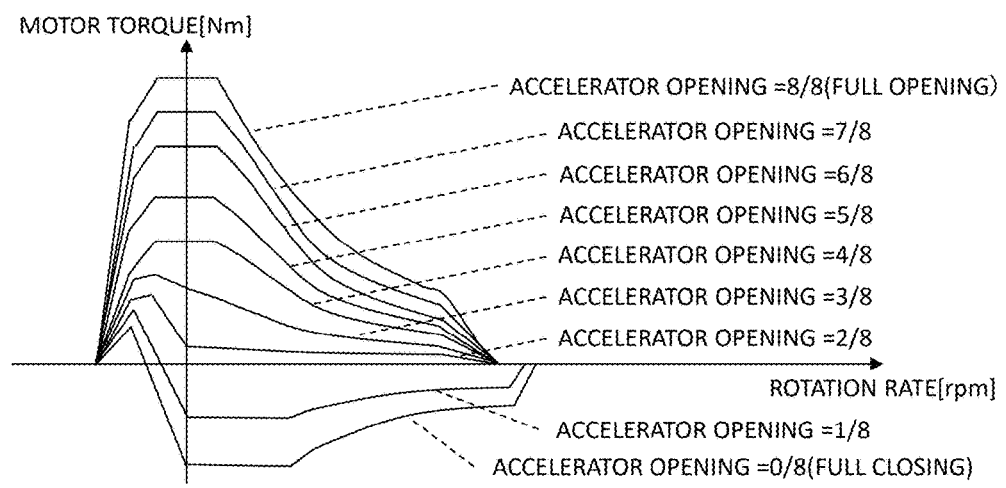
FIG. 3 is a diagram illustrating an example of an accelerator position (accelerator opening degree)-torque table.

In Step S202, a first torque target value Tm1* is set. Specifically, the first torque target value Tm1* is set on the basis of the accelerator position AP input in Step S201 and the motor rotation speed $\omega m$ by referring to an accelerator position-torque table illustrated in FIG. 3. As described above, the control device for electric motor vehicle according to the embodiment can be applied to the vehicle capable of controlling acceleration/deceleration and the stop of the vehicle only by the operation of the accelerator pedal. To at least ensure stopping the vehicle by full closing of the accelerator pedal, in the accelerator position-torque table illustrated in FIG. 3, a motor torque is set such that a motor regeneration amount with the accelerator position of 0 (fully closed) increases. That is, when the motor rotation speed is positive and at least the accelerator position is 0 (fully closed), the negative motor torque is set so as to work the regenerative braking force. Note that, the accelerator position-torque table is not limited to the table illustrated in FIG. 3.

In Step S203, a stop control process is performed. Specifically, whether the electric motor vehicle is just before the stop of the vehicle is determined. The first torque target value Tm1* calculated in Step S202 is set as a motor torque command value Tm* before the electric motor vehicle is just before the stop of the vehicle, and a second torque target value Tm2*, which converges to a disturbance torque command value Td, with a reduction in the motor rotation speed is set as the motor torque command value Tm* after the electric motor vehicle is just before the stop of the vehicle. This second torque target value Tm2* is a positive torque on an uphill road, a negative torque on a downhill road, and almost 0 on a flat road. In this way, the vehicle stop state can be maintained regardless of a gradient of a road surface as described later. The detail of the stop control process is described later.

In Step S204, a d-axis current target value id* and a q-axis current target value iq* are obtained on the basis of the motor torque target value Tm* calculated in Step S203, the motor rotation speed ωm, and the direct-current voltage value Vdc. For example, a table obtaining a relationship of the d-axis current target value and the q-axis current target value with the torque command value, the motor rotation speed, and the direct-current voltage value is prepared in advance and the d-axis current target value id* and the q-axis current target value iq* are obtained by referring to this table.

In Step S205, a current control is performed to match a d-axis current id and a q-axis current iq with the d-axis current target value id* and the q-axis current target value iq* obtained in Step S204, respectively. To this end, the d-axis current id and the q-axis current iq are first obtained on the basis of the three-phase alternating current values iu, iv and iw and the rotator phase α of the electric motor 4 input in Step S201. Subsequently, d-axis and q-axis voltage command values vd and vq are calculated from deviations between the d-axis and q-axis current command values id* and iq* and the d-axis and q-axis currents id and iq. It should be noted that a non-interference voltage necessary to cancel out an interference voltage between d-q orthogonal coordinate axes may be added to the calculated d-axis and q-axis voltage command values vd and vq.

Subsequently, from the d-axis and q-axis voltage command values vd and vq and the rotator phase α of the electric motor 4 and from the three-phase alternating-current voltage command values vu, vv, and vw and the current voltage value Vdc, PWM signals tu (%), tv (%), and tw (%) are obtained. By opening and closing the switching elements of the inverter 3 by the PWM signals tu, tv and tw obtained in this way, the electric motor 4 can be driven with a desired torque instructed by the torque command value Tm*.

Here, before the stop control process performed in Step S203 is described, a transfer characteristic Gp(s) from the motor torque Tm to the motor rotation speed ωm is described in the control device for electric motor vehicle according to the embodiment.

Figure 4:
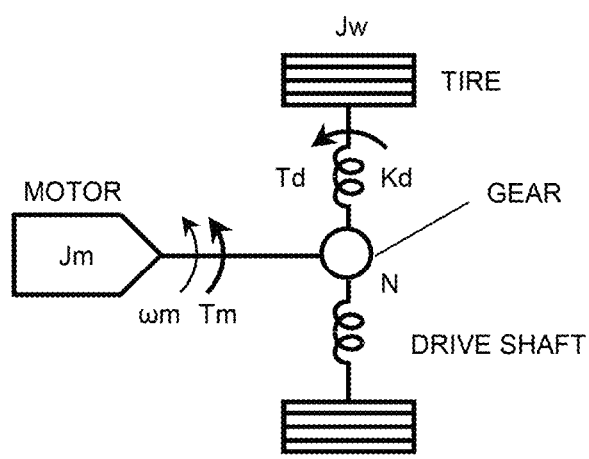
FIG. 4 is a diagram modeling a drive force transmission system of the vehicle.
Figure 5:
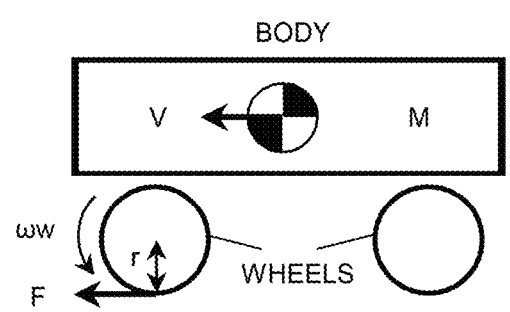
FIG. 5 is a diagram modeling the drive force transmission system of the vehicle.

FIG. 4 and FIG. 5 are diagrams modeling a drive force transmission system of the vehicle, and respective parameters in the diagrams are as described below.

Jm: inertia of electric motor
Jw: inertia of drive wheels
M: weight of vehicle
KD: torsional rigidity of drive system
Kt: coefficient relating to friction between tires and road surface
N: overall gear ratio
r excessive radius of tires
ωm: angular velocity of electric motor
Tm: torque target value Tm*
TD: torque of drive wheels
F: force applied to vehicle
V: speed of vehicle
ωw: angular velocity of drive wheels The following equations of motion can be derived from FIG. 4 and FIG. 5. Note that, the asterisk (*) attached to the right-upper corner of a symbol in the following Equations (1) to (3) indicates a time differential.

[Equation 1]
$$Jm \cdot \omega^*m = Tm - TD/N \quad (1)$$

[Equation 2]
$$2Jw \cdot \omega^*w = TD - rF \quad (2)$$

[Equation 3]
$$MV^* = F \quad (3)$$

[Equation 4]
$$TD = KD \int (\omega m/N - \omega w) dt \quad (4)$$

[Equation 5]
$$F = Kt(r\omega w - V) \quad (5)$$

The transfer characteristic Gp(s) from the torque target value Tm of the electric motor 4 to the motor rotation speed ωm obtained on the basis of the equations of motion (1) to (5) is expressed by the following Equation (6).

[Equation 6]
$$Gp(s) = (b_3 s^3 + b_2 s^2 + b_1 s + b_0)/s(a_4 s^3 + a_3 s^2 + a_2 s + a_1) \quad (6)$$

Here, each parameter in Equation (6) is expressed by the following Equation (7).

[Equation 7]
$$a_4 = 2Jm \cdot Jw \cdot M$$

$$a_6 = Jm(2Jw + Mr^2)Kt$$

$$a_2 = (Jm + 2Jw/N^2)M \cdot KD$$

$$a_1 = (Jm + 2Jw/N^2 + Mr^2/N^2)KD \cdot Kt$$

$$b_3 = 2Jw \cdot M$$

$$b_2 = (2Jw + Mr^2)Kt$$

$$b_1 = M \cdot KD$$

$$b_0 = KD \cdot Kt \quad (7)$$

Through examinations, the poles and 0 points of a transfer function shown in Equation (6) can be approximated to a transfer function of the following Equation (8), and one pole and one 0 points indicate values extremely close to each other. This is equivalent to that α and β of the following Equation (8) indicate values extremely close to each other.

[Equation 8]
$$Gp(s) = (s+\beta)(b_2's^2 + b_1's + b_0')/s(s+\alpha)(a_3's^2 + a_2's + a_1') \quad (8)$$

Accordingly, by performing pole-zero cancellation (approximation to α=β) in Equation (8), Gp(s) constitutes a transfer characteristic of (second order)/(third order) as shown in the following Equation (9).

[Equation 9]
$$G_p(s) = \frac{(b_2' s^2 + b_1' s + b_0')}{s(a_3' s^2 + a_2' s + a_1')} \cdot \frac{\beta}{\alpha} \quad (9)$$

The following describes the transfer characteristic Gp(s) from the braking amount B to the motor rotation speed ωm.

Figure 6:
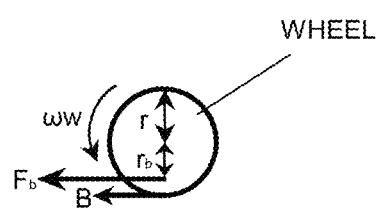
FIG. 6 is a diagram modeling a braking force transmission system of the vehicle.

FIG. 6 is a diagram modeling a braking force transmission system of the vehicle, and respective parameters in the diagram are as described below.

rb: radius up to a point of action at which a frictional braking force acts

F/B: braking amount by friction brake at point of action

B: braking amount

The following equations of motion can be derived from FIG. 6.

[Equation 10]

$$B = F/B \cdot r_b/r \quad (10)$$

Note that, the F/B in Equation (10) is as follows.

$\omega w > 0: F/B > 0$ $\omega w = 0: F/B = 0$ $\omega w < 0: F/B < 0$

The following equations of motion can be derived from FIG. 4, FIG. 5, and FIG. 6.

[Equation 11]

$$2Jw \cdot \omega^* w = TD - rF - rB \quad (11)$$

To obtain the transfer characteristic Gb(s) from the braking amount B to the motor rotation speed ωm on the basis of the equations of motion indicated by the Equations (1), (3), (4), (5), and (11), the transfer characteristic Gb(s) is expressed by the following Equation (12).

[Equation 12]

$$Gb(s) = (b_1 s + b_0)/s(a_4 s^3 + a_3 s^2 + a_2 s + a_1) \quad (12)$$

Note that, the respective parameters in Equation (12) are expressed by the following Equation (13).

[Equation 13]

$a_7 = 2Jm \cdot Jw \cdot M \cdot N^2$ $a_3 = (2Jw + Mr^2) \cdot Jm \cdot Kt \cdot N^2$ $a_2 = (JmN^2 + 2Jw) \cdot M \cdot KD$ $a_1 = (Jm \cdot N^2 + 2Jw + Mr^2) \cdot KD \cdot Kt$ $b_1 = r \cdot M \cdot KD \cdot N$ $$b_0 = r \cdot RD \cdot Kt \cdot N \quad (13)$$

Figure 7:
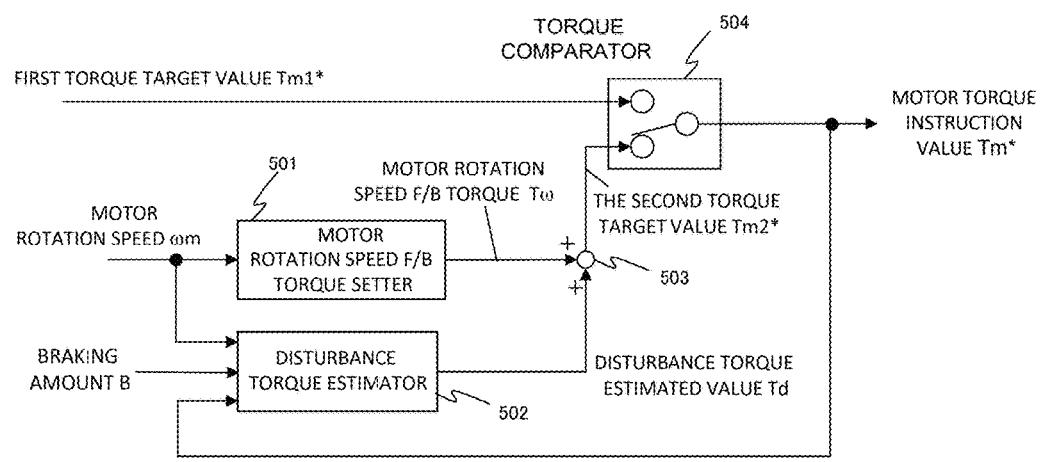
FIG. 7 is a block diagram for achieving a stop control process.

Next, the detail of the stop control process performed in Step S203 of FIG. 2 is described. FIG. 7 is a block diagram for achieving the stop control process.

A motor rotation speed F/B torque setting device 501 calculates a motor rotation speed feedback torque Tω (hereinafter referred to as a motor rotation speed F/B torque Tω) to stop the electric motor vehicle by the regenerative braking force from the electric motor 4 on the basis of the detected motor rotation speed ωm.

Figure 8:
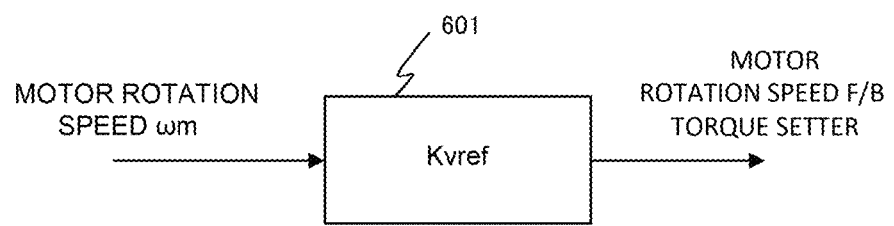
FIG. 8 is a diagram describing a method for calculating a motor rotation speed F/B torque $T\omega$ based on a motor rotation speed $\omega m$.

FIG. 8 is a diagram describing a method for calculating the motor rotation speed F/B torque ωm on the basis of the motor rotation speed ωm. The motor rotation speed F/B torque setting device 501 includes a multiplier 601 and calculates the motor rotation speed F/B torque Tω by multiplying the motor rotation speed ωm by a gain Kvref. However, Kvref is a negative (minus) value necessary to stop the electric motor vehicle just before the electric motor vehicle stops, and appropriately set, for example, from experimental data or similar data. That is, the motor rotation speed F/B torque Tω is set as a torque capable of obtaining a larger regenerative braking force as the motor rotation speed ωm increases.

It should be noted that, although the motor rotation speed F/B torque setting device 501 is described to calculate the motor rotation speed F/B torque Tω by multiplying the motor rotation speed ωm by the gain Kvref, the motor rotation speed F/B torque Tω may be calculated using a regenerative torque table defining a regenerative torque with respect to the motor rotation speed ωm, an attenuation rate table storing an attenuation rate of the motor rotation speed ωm in advance.

A disturbance torque estimator 502 calculates the disturbance torque estimated value Td on the basis of the detected motor rotation speed ωm, the braking amount B, and the motor torque command value Tm*.

Figure 9:
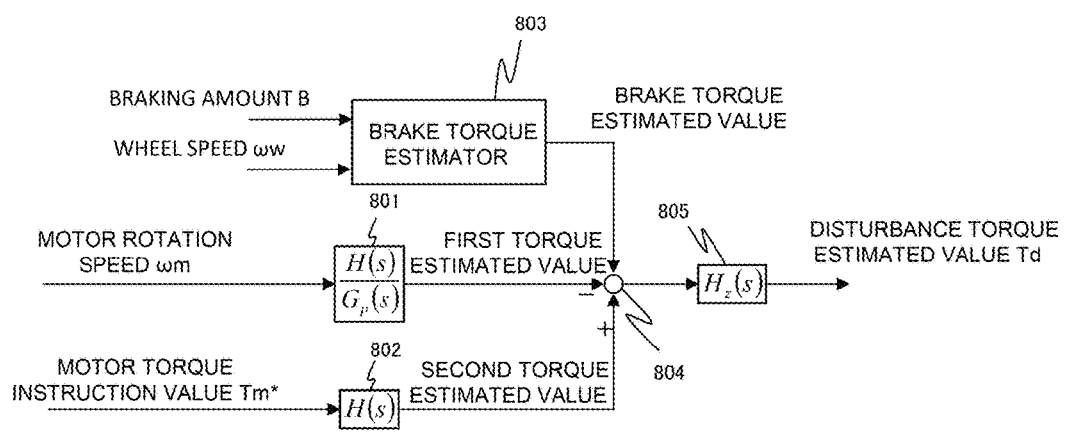
FIG. 9 is a diagram describing a method for calculating a disturbance torque estimated value Td.

FIG. 9 is a diagram describing a method for calculating the disturbance torque estimated value Td on the basis of the motor rotation speed ωm, the braking amount B, and the motor torque command value Tm*.

A control block 801 functions as a filter having a transfer characteristic H(s)/Gp(s) and inputs the motor rotation speed ωm and performs the filtering process, thus calculating a first motor torque estimated value. Gp(s) is a model for the transfer characteristic from the torque input to the vehicle until the rotation speed of the motor and is expressed by Equation (9). H(s) is a low-pass filter having such a transfer characteristic that a difference between the denominator degree and the numerator degree is equal to or more than a difference between the denominator degree and the numerator degree of a model Gp(s).

A control block 802 functions as a low-pass filter having a transfer characteristic H(s) and inputs the motor torque command value Tm* and performs the filtering process, thus calculating a second motor torque estimated value.

A brake torque estimator 803 inputs the braking amount B and a wheel speed caw to calculate the brake torque estimated value by a brake torque estimating method, which will be described later. Here, since the braking force by the brake acts on a decelerating direction both in the forward movement and retreat of the vehicle, the sign of the brake torque estimated value needs to be inverted according to the sign of the vehicle longitudinal speed (such as a vehicle body speed, the wheel speed, the motor rotation speed, and a drive shaft rotation speed). Therefore, the brake torque estimated value is set negative for the forward movement of the vehicle and is set positive for the retreat of the vehicle according to the wheel speed ωw.

Figure 10:
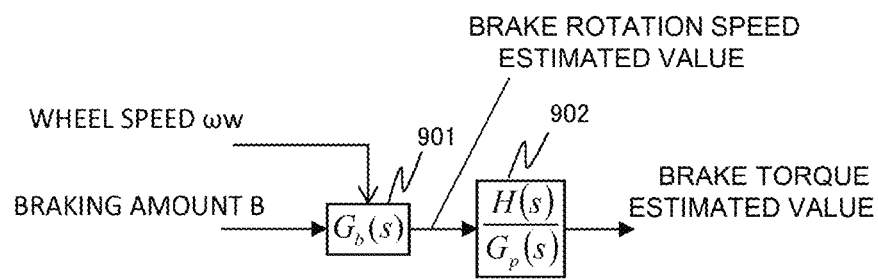
FIG. 10 is a diagram describing a method for calculating a brake torque estimated value in a control device for electric motor vehicle of the first embodiment.

The following describes details of the brake torque estimator 803 with reference to FIG. 10. FIG. 10 is a block diagram describing a method for calculating the brake torque estimated value on the basis of the braking amount B and the wheel speed ωw.

A control block 901 performs the filtering process on the braking amount B with the above-described transfer characteristic Gb(s) to calculate a brake rotation speed estimated value.

A control block 902 functions as a filter having a transfer characteristic H(s)/Gp(s) using a low-pass filter H(s). The control block 902 inputs the brake rotation speed estimated value and performs the filtering process to calculate the brake torque estimated value. The calculated brake torque estimated value is output to an adder/subtractor 804.

Referring back to FIG. 9, the explanation will be continued. The adder/subtractor 804 subtracts the first motor torque estimated value from the second motor torque estimated value and adds the brake torque estimated value to the obtained value. The addition of the brake torque estimated value ensures calculating the disturbance torque estimated value Td at which the brake torque caused by the braking amount B is cancelled at a later stage. The calculated value is output to a control block 805.

The control block 805 is a filter having the transfer characteristic Hz(s), which will be described later, and inputs the output from the adder/subtractor 804 and performs the filtering process, thus calculating the disturbance torque estimated value Td.

Here, the following describes the transfer characteristic Hz(s). The following Equation (14) is obtained by rewriting Equation (9). $\zeta z$, $\omega z$, $\zeta p$, and $\omega p$ in Equation (14) are each expressed by Equation (15).

[Equation 14]

$$Gp(s)=Mp \cdot (s^2+2\zeta z \cdot \omega z \cdot s+\omega z^2)/s(s^2+2\ \zeta p \cdot \omega p \cdot s+\omega p^2) \quad (14)$$

[Equation 15]

$$\zeta z=b_1'/2(b_0' \cdot b_2')^{1/2}$$

$$\omega z=(b_0'/b_2')^{1/2}$$

$$\zeta p=a_2'/2(a_1' \cdot a_3')^{1/2}$$

$$\omega p=(a_1'/a_3')^{1/2} \quad (15)$$

As described above, Hz(s) is expressed by the following equation (16).

[Equation 16]

$$Hz(s)=(s^2+2\zeta z \cdot \omega z \cdot s+\omega z^2)/(s^2+2\zeta c \cdot \omega z \cdot s+\omega z^2) \quad (16)$$

It should be noted that, in this embodiment, a disturbance observer estimates the disturbance torque as illustrated in FIG. 9.

Here, while the air resistance, a modeling error caused by a variation of a vehicle weight due to the number of passengers and load capacity, a rolling resistance of the tires, a gradient resistance of the road surface, and a similar resistance are thought as the disturbances, a disturbance factor dominant just before the stop of the vehicle is the gradient resistance. While the disturbance factors differ depending on driving conditions, the disturbance factors described above can be collectively estimated regardless of the brake operation amount by the driver since the disturbance torque estimator 502 calculates the disturbance torque estimated value Td on the basis of the motor torque command value Tm*, the motor rotation speed $\omega m$, the braking amount B, which is the resistance component unrelated to the gradient, and the vehicle model Gp(s). This achieves a smooth vehicle stop from deceleration under any driving condition.

Referring back to FIG. 7, the explanation will be continued. An adder 503 calculates the second torque target value Tm2* by adding the motor rotation speed F/B torque T$\omega$ calculated by the motor rotation speed F/B torque setting device 501 and the disturbance torque estimated value Td calculated by the disturbance torque estimator 502.

A torque comparator 504 compares the magnitudes of the first torque target value Tm1* with the second torque target value Tm2* and sets the larger torque target value as the motor torque command value Tm*. The second torque target value Tm2* is smaller than the first torque target value Tm1* during the travel of the vehicle. When the vehicle decelerates and reaches just before the stop of the vehicle (the vehicle speed is equal to or less than a predetermined vehicle speed), the second torque target value Tm2* becomes larger than the first torque target value Tm1*. Thus, when the first torque target value Tm1* is larger than the second torque target value Tm2*, the torque comparator 504 determines that the vehicle is prior to just before the stop of the vehicle and sets the motor torque command value Tm* to the first torque target value Tm1*. Further, when the second torque target value Tm2* becomes larger than the first torque target value Tm1*, the torque comparator 504 determines that the vehicle is just before the stop of the vehicle and switches the motor torque command value Tm* from the first torque target value Tm1* to the second torque target value Tm2*. It should be noted that the second torque target value Tm2* is a positive torque on an uphill road, a negative torque on a downhill road, and converges to almost zero on a flat road to maintain the vehicle stop state.

Figure 11:
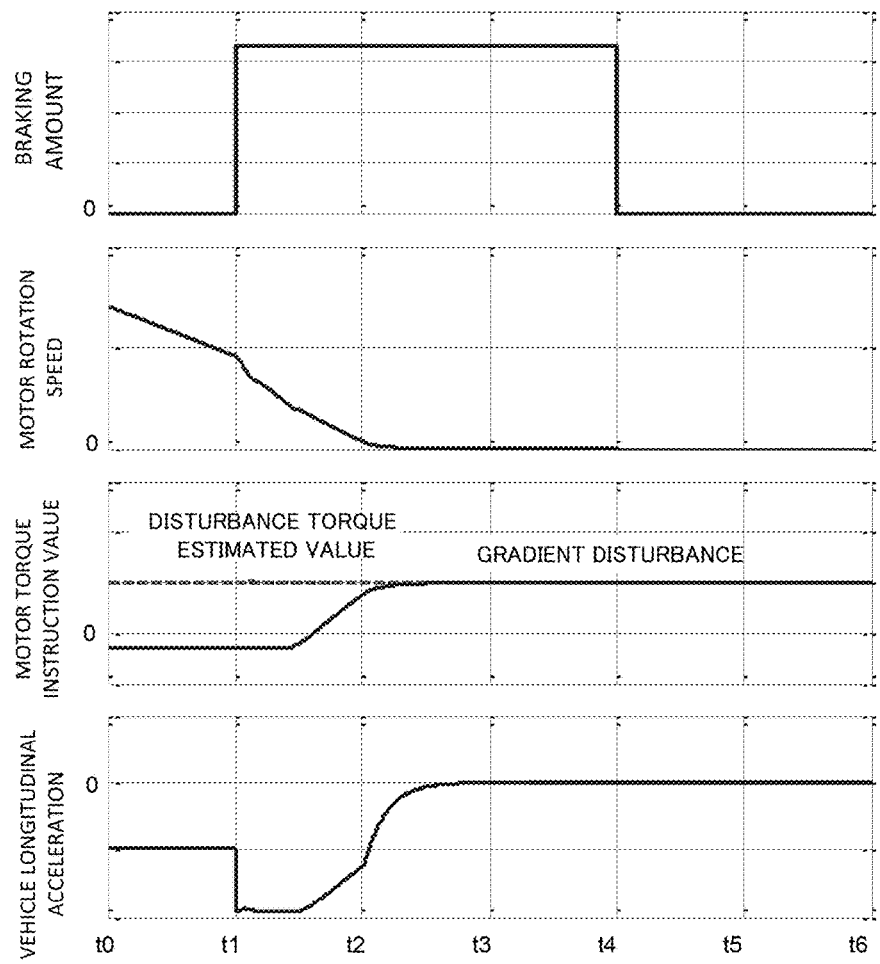
FIG. 11 are diagrams illustrating examples of control results by the control device for electric motor vehicle of the first embodiment.
Figure 12:
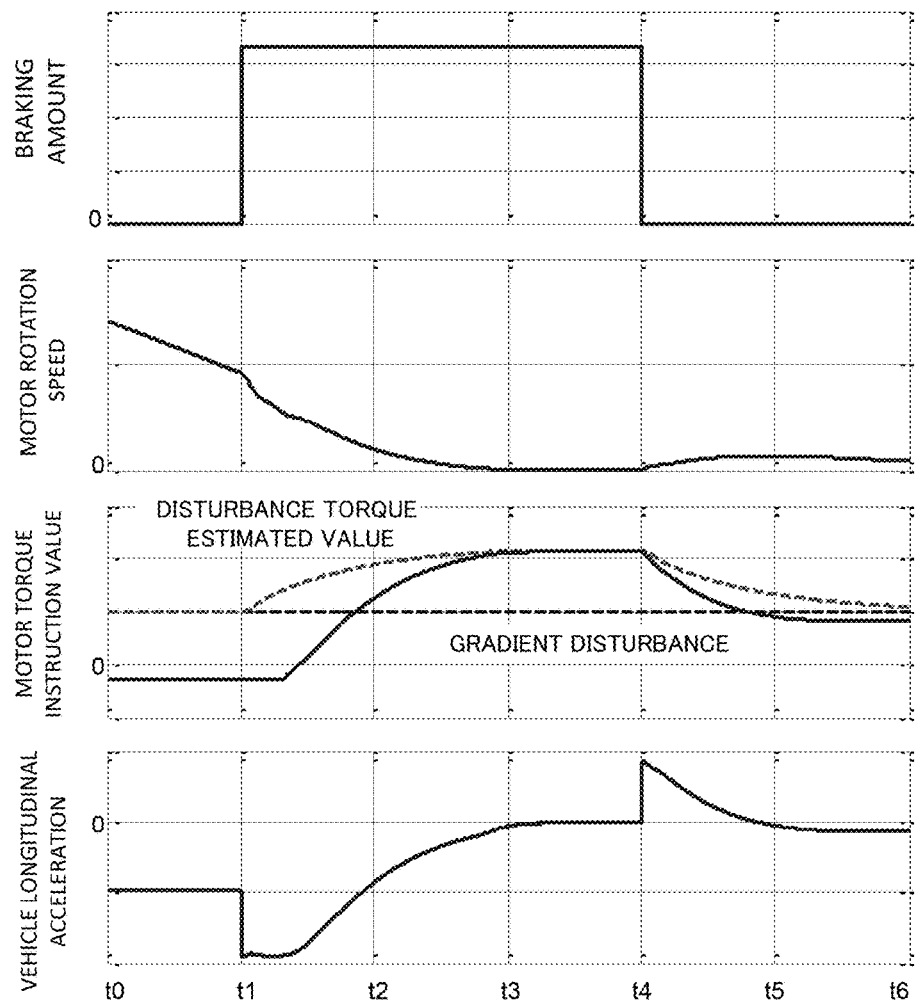
FIG. 12 are diagrams illustrating examples of control results of a comparative example.

The following describes effects when the control device for electric motor vehicle according to the embodiment is applied to the electric vehicle, especially describes a control during the braking of the brake with reference to FIG. 11 and FIG. 12.

FIG. 11 are diagrams illustrating examples of the control results by the control device for electric motor vehicle according to the embodiment. FIG. 11 illustrate the control results when the vehicle stops on the uphill roads at a constant gradient. FIG. 11 shows the braking amount, the motor rotation speed, the motor torque command value, and a vehicle longitudinal acceleration in the order from the above. The dotted line in the diagram expressing the motor torque command value shows the disturbance torque estimated value, and the dash-dotted line expresses the gradient disturbance.

At a time t0, the electric motor 4 is decelerated on the basis of the first torque target value Tm1* calculated in Step S202 in FIG. 2. The disturbance torque estimated value matches the gradient disturbance. It is seen that the gradient disturbance on the uphill road can be accurately estimated.

At a time t1, when the driver depresses the brake pedal, the braking amount B increases. At this time, it is seen that the use of the first torque target value Tm1* and the braking amount B in combination increases the vehicle longitudinal acceleration in the braking side, namely, the negative direction.

At a time t2, the electric motor 4 is decelerated on the basis of the second torque target value Tm2* calculated in Step S203 in FIG. 2. At this time, the disturbance torque estimated value constituting the second torque target value Tm2* considers the braking amount B in the process by the control block 502 in FIG. 7. Accordingly, the disturbance torque estimated value matches the gradient disturbance regardless of the increase in the braking amount B.

At a time t3, the vehicle longitudinal acceleration and the motor rotation speed converge to 0. It is seen that the vehicle stops with the disturbance torque estimated value and the gradient disturbance matched.

At a time t4, although the braking amount B is released by the brake operation by the driver, the braking amount B is canceled from the disturbance torque estimated value. Accordingly, it is seen that a state where the disturbance torque estimated value matches the gradient disturbance can be maintained. Even at the time t4 and after the time t4, the vehicle longitudinal acceleration and the motor rotation speed still converge to 0. It is seen that the vehicle stop state can be maintained.

The following describes the control results in the case where the braking amount B is not considered to calculate the disturbance torque estimated value as a comparative example with reference to FIG. 12.

At a time t0, the electric motor 4 is decelerated on the basis of the first torque target value Tm1* calculated in Step S202 in FIG. 2. At this time point, the disturbance torque estimated value matches the gradient disturbance. It is seen that the gradient disturbance on the uphill road can be accurately estimated.

At a time t1, the braking amount B increases by the brake operation by the driver. At this time, it is seen that the use of the first torque target value Tm1* and the braking amount B in combination increases the vehicle longitudinal acceleration in the braking side.

At a time t2, the electric motor 4 is decelerated on the basis of the second torque target value Tm2* calculated in Step S203 in FIG. 2. In this comparative example, the control block 502 in FIG. 7 does not consider the braking amount B. Accordingly, the braking force by the braking amount B is mistakenly recognized as the disturbance caused by the gradient. Accordingly, the disturbance torque estimated value indicates the value larger than the actual gradient disturbance. It is seen that the disturbance torque estimated value mistakenly estimates that the road is the steep uphill road more than the actual gradient.

At a time t3, the vehicle longitudinal acceleration and the motor rotation speed converge to 0. It is seen that the use of the disturbance torque estimated value and the braking amount B in combination maintains the vehicle stop state.

At a time t4, the brake operation by the driver releases the braking amount B. At this time, the disturbance torque estimated value mistakenly estimates that the road is the steep uphill road more than the actual gradient. Therefore, when the braking amount B is released, the vehicle longitudinal acceleration increases in the driving side and after that, the vehicle moves forward. It is seen that the vehicle stop state cannot be maintained.

As described above, according to the first embodiment, the control device for electric motor vehicle using the motor as the traveling driving source and configured to decelerate by a regenerative braking force from the motor detects the accelerator operation amount, calculates the disturbance torque estimated value, and detects or estimates the resistance component unrelated to the gradient from the vehicle state. The control device for electric motor vehicle corrects the disturbance torque estimated value according to the detected or estimated resistance component unrelated to the gradient. The motor is controlled on the basis of the motor torque command value. When the accelerator operation amount is equal to or less than the predetermined value and the electric motor vehicle is just before the stop of the vehicle, the motor torque command value converges to the corrected disturbance torque estimated value in conjunction with the reduction of the rotation speed of the motor. This achieves the smooth deceleration without the acceleration vibration in the longitudinal direction just before the stop of the vehicle. The control device for electric motor vehicle detects or estimates the resistances unrelated to the gradient (such as the braking amount, the air resistance, the rolling resistance, and the turning resistance) from the vehicle state to correct the disturbance torque estimated value. This allows matching the disturbance torque estimated value with the gradient disturbance, thereby ensuring maintaining the vehicle stop state on slope roads.

It should be noted that, the accelerator operation amount is equal to or less than the predetermined value intends the accelerator operation amount when the vehicle sufficiently travels at a low speed (for example, a speed of 15 km/h or less) without an intervention of a braking device separate from the regeneration braking. It should be noted that, needless to say, the exemplary vehicle speed is one example.

The first embodiment calculates the brake torque estimated value from the braking amount to correct the disturbance torque estimated value on the basis of the brake torque estimated value. Accordingly, even if the braking force other than the regenerative braking by the motor is applied to the vehicle, the braking amount can be canceled from the disturbance torque estimated value. This ensures maintaining the vehicle stop state even if the braking amount is released after the vehicle stop.

With the first embodiment, the brake operation amount by the driver is detected, and the braking amount is decided on the basis of the detected brake operation amount. This allows the correction of the disturbance torque estimated value on the basis of the sensor value detected by a brake fluid pressure sensor, a brake pedal stroke sensor, or a similar device, thereby ensuring estimating the disturbance torque on the basis of the actual measured value of the vehicle.

The braking amount may be decided on the basis of the command value regarding the brake operation (such as a braking amount command value). This ensures estimating the disturbance torque estimated value without a dead time such as a sensor detection delay.

With the first embodiment, the braking amount is decided considering the responsiveness from when the braking amount is input to the vehicle until the braking force acts on the vehicle. Accordingly, for example, calculating the braking amount taking the responsiveness such as from the command value input to the friction brake until the fluid pressure responds to the command and from the generation of the fluid pressure until the fluid pressure acts to the braking force of the vehicle allows restraining a model error between the vehicle model and the actual vehicle.

With the first embodiment, the sign for the brake torque estimated value differs depending on the traveling direction of the vehicle. Accordingly, the brake torque estimated value can be appropriately estimated both in the forward movement and retreat of the vehicle.

Furthermore, the first embodiment calculates the brake torque estimated value using the filter including the model $Gb(s)$ for the transfer characteristic from the input of the braking amount to the vehicle until the motor rotation speed. This ensures accurately canceling the braking amount from the disturbance torque estimated value.

The first embodiment additionally uses the filter having a transfer characteristic $H(s)/Gp(s)$, which is constituted of the low-pass filter $H(s)$ and an inverse system of the model $Gp(s)$ for the transfer characteristic from the torque input to the vehicle until the rotation speed of the motor to calculate the brake torque estimated value. This ensures further accurately cancelling the braking amount from the disturbance torque estimated value.

Second Embodiment

A control device for electric motor vehicle of the second embodiment uses a vibration damping control together in addition to the above-described first embodiment. The following describes the control device for electric motor vehicle in this embodiment, especially aspects of the combination use of the vibration damping control.

Figure 13:
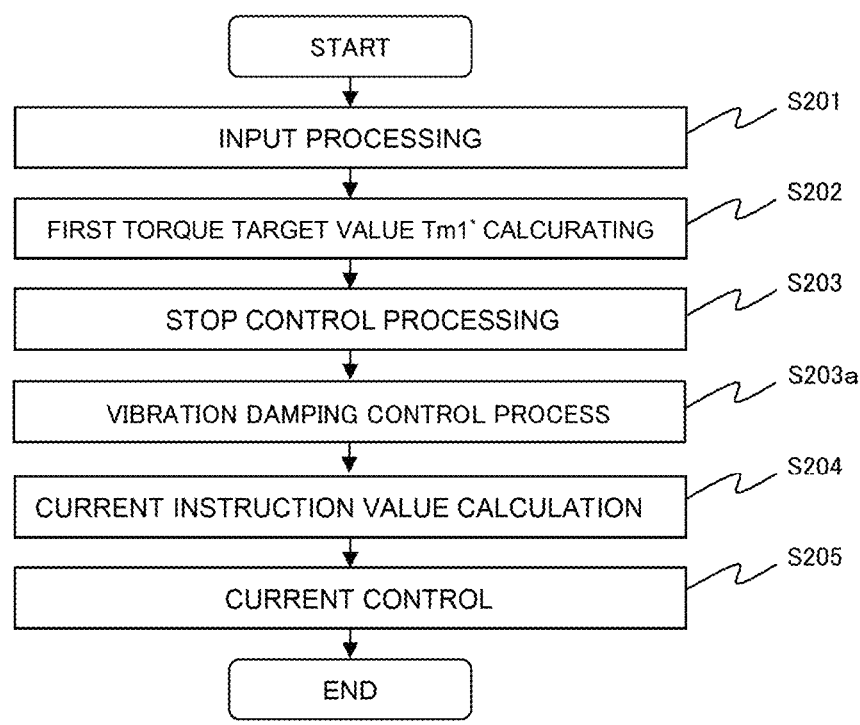
FIG. 13 is a flow of processes for a motor current control performed by a motor controller provided with a control device for electric motor vehicle of a second embodiment.

FIG. 13 is a control flowchart diagram performed by the motor controller 2 provided with the control device for electric motor vehicle of the second embodiment. In addition to the control sequence in the first embodiment illustrated in FIG. 2, the vibration damping control process is performed in Step S203a.

Figure 14:
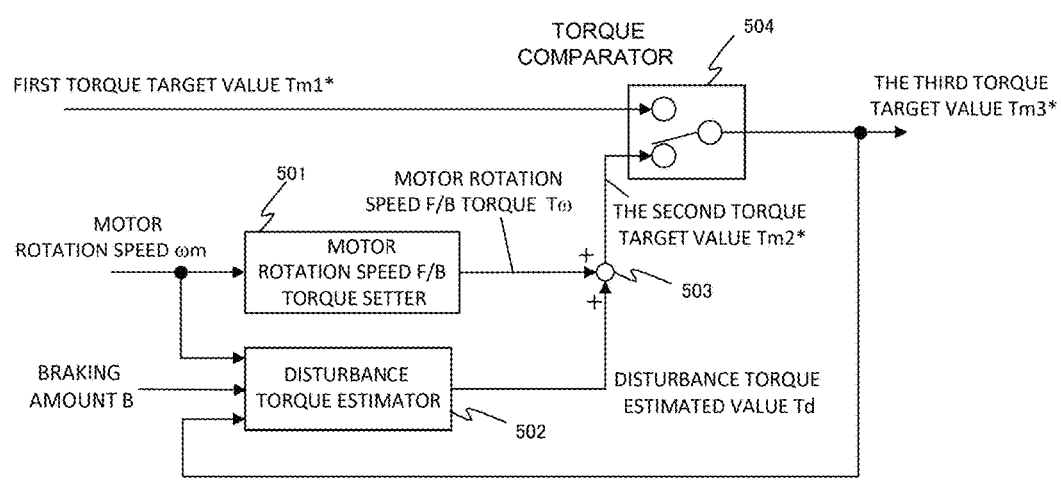
FIG. 14 is a block diagram of a stop control process in the control device for electric motor vehicle of the second embodiment.

As illustrated in FIG. 13, the process in Step S203a is performed after Step S203 (stop control process). This embodiment sets the motor torque command value Tm* calculated in Step S203 in the above-described first embodiment, that is, the motor torque command value Tm* (see FIG. 7), which is the output from the torque comparator 504, as a third torque target value Tm3* (see FIG. 14). By performing the vibration damping control process on the third torque target value Tm3*, the motor torque command value Tm* is obtained.

Figure 15:
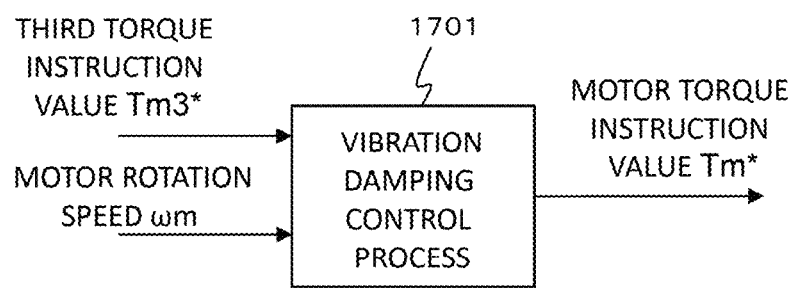
FIG. 15 is a block diagram of a vibration damping control process in the control device for electric motor vehicle of the second embodiment.

More specifically, in Step S203a, the motor torque command value Tm3* calculated in Step S203 and the motor rotation speed ωm are input to a vibration damping control block 1501 (see FIG. 15). The vibration damping control block 1501 calculates the motor torque command value Tm* after the vibration damping control, which reduces a torque transmission system vibration (such as a torsional vibration of the drive shaft) without sacrificing the response of a drive shaft torque. The following describes an example of the vibration damping control process performed by the vibration damping control block 1501 with reference to FIG. 16.

Figure 16:
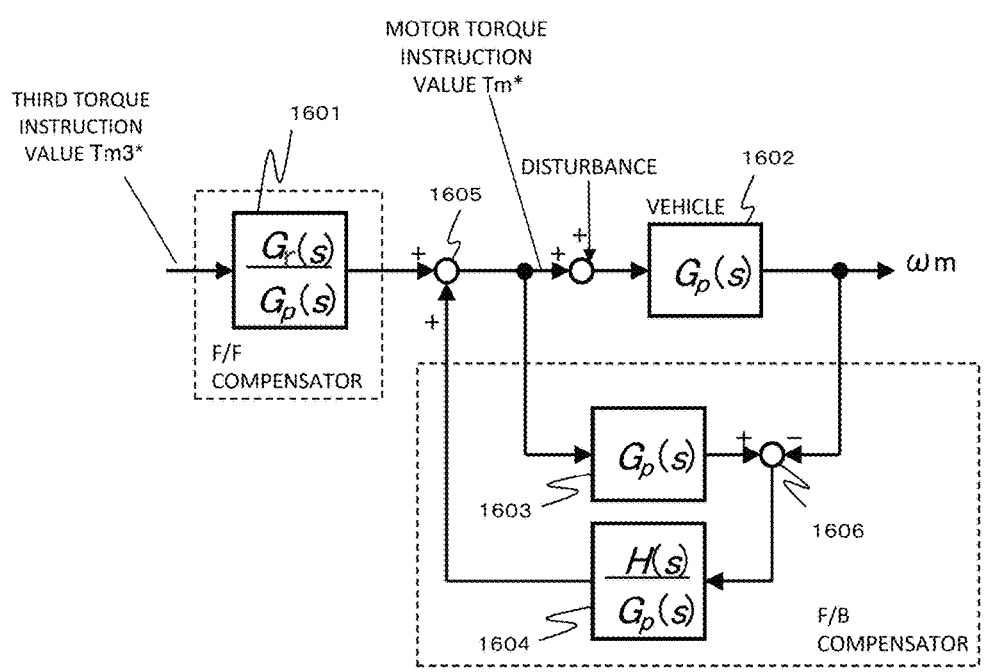
FIG. 16 is a block diagram expressing details of the vibration damping control process in the control device for electric motor vehicle of the second embodiment.

FIG. 16 is a block diagram of the vibration damping control process used in this embodiment. A feedforward compensator 1601 (hereinafter referred to as an F/F compensator) functions as a filter having a transfer characteristic Gr(s)/Gp(s), which is constituted of a transfer characteristic Gr(s) and an inverse system of the model Gp(s) for the transfer characteristic from the torque input to the vehicle until the rotation speed of the motor. By inputting the third torque target value Tm3* and performing the filtering process, the vibration damping control process by the feedforward compensation is performed. The used transfer characteristic Gr(s) can be expressed by the following Equation (17).

[Equation 17]

$$Gr(s) = Mp \cdot (s^2 + 2\zeta_z \cdot \omega z \cdot s + \omega z^2) / s(s^2 + 2\omega p \cdot s + \omega p^2) \quad (17)$$

It should be noted that, the vibration damping control F/F performed by the F/F compensator 1601 may be the vibration damping control described in JP2001-45613A or may be the vibration damping control described in JP2002-152916A.

Control blocks 1603 and 1604 are filters used for the feedback control (hereinafter the feedback is referred to as the F/B). The control block 1603 is the filter having the above-described transfer characteristic Gp(s). The control block 1603 inputs a value obtained by adding the output from the F/F compensator 1601, which is output from an adder 1605, to the output from the control block 1604 described later and performs the filtering process. A subtractor 1606 subtracts the motor rotation speed ωm from the value output from the control block 1603. The subtracted value is input to the control block 1604. The control block 1604 is a filter having a transfer characteristic H(s)/Gp(s), which is constituted of the low-pass filter H(s) and an inverse system of the model Gp(s) for the transfer characteristic from the torque input to the vehicle until the rotation speed of the motor. The control block 1604 inputs the output from the subtractor 1606, performs the filtering process, and outputs the value calculated as an F/B compensation torque to the adder 1605.

The adder 1605 adds the third torque target value Tm3* on which the vibration damping control process has been performed by the F/F compensation to the above-described value calculated as the F/B compensation torque to calculate the motor torque command value Tm* to reduce the vibrations in the torque transmission system for the vehicle.

It should be noted that, the vibration damping control performed by the vibration damping control block 1501 may be the vibration damping control described in JP2003-9566A or may be the vibration damping control described in JP2010-288332A.

Figure 17:
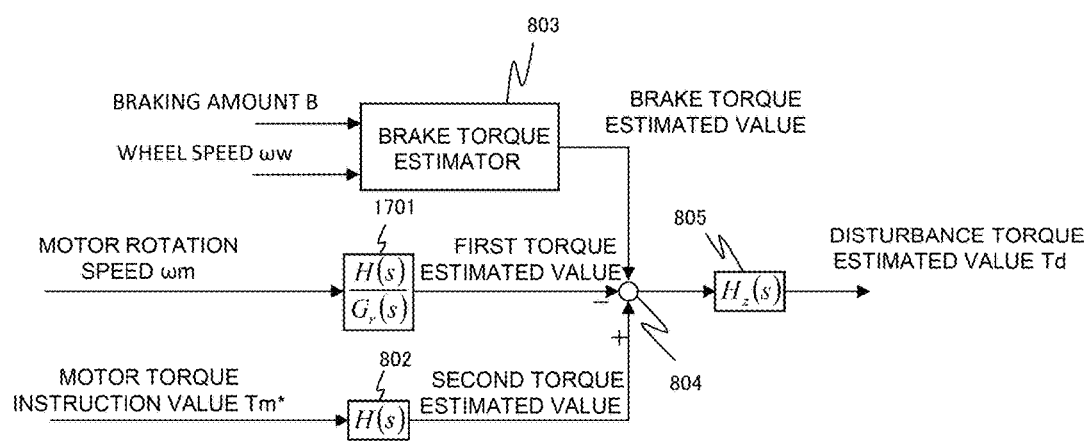
FIG. 17 is a diagram describing a method for calculating a brake torque estimated value in the control device for electric motor vehicle of the second embodiment.

For combination use of the vibration damping control (F/F compensator), by an algorithm of the vibration damping control, the vehicle model Gp(s) expressed by Equation (14) in the first embodiment can be regarded as the transfer characteristic Gr(s) indicated in Equation (17). Specifically, the filter having the transfer characteristic H(s)/Gp(s), which is shown in the control block 801 in FIG. 9, can be regarded as the filter having the transfer characteristic H(s)/Gr(s) as illustrated in a control block 1701 in FIG. 17.

Subsequently, the following describes a method for calculating a brake torque estimated value for combination use of the vibration damping control (F/B compensator).

Figure 18:
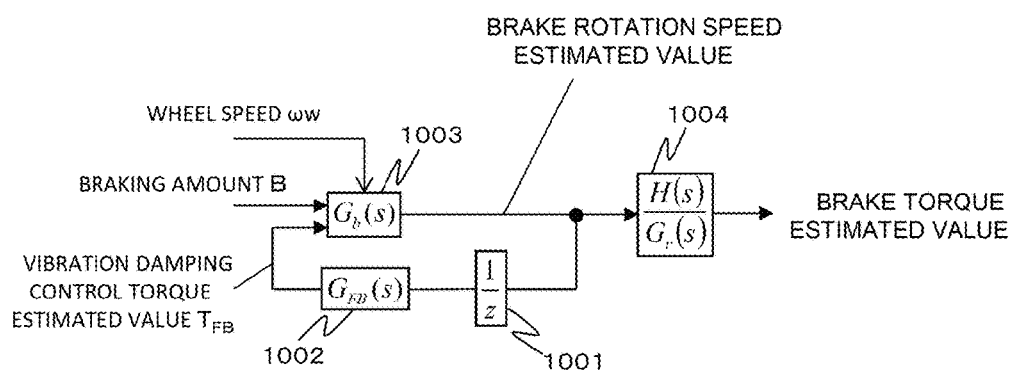
FIG. 18 is a diagram describing a method for calculating a brake torque estimated value in the control device for electric motor vehicle of the second embodiment.

FIG. 18 is a block diagram describing the calculation of the brake torque estimated value in combination use of the vibration damping control.

A control block 1001 sets a past value of the brake rotation speed estimated value considering the dead time. It should be noted that, the dead time here is, for example, the sensor detection delay of the vehicle.

A control block 1002 performs a vibration damping control (F/B compensator) process $G_{FB}(s)$ according to the past value of the brake rotation speed estimated value set by the control block 1001 to calculate a vibration damping control torque estimated value $T_{F/B}$. The following describes the more details with reference to FIG. 19.

Figure 19:
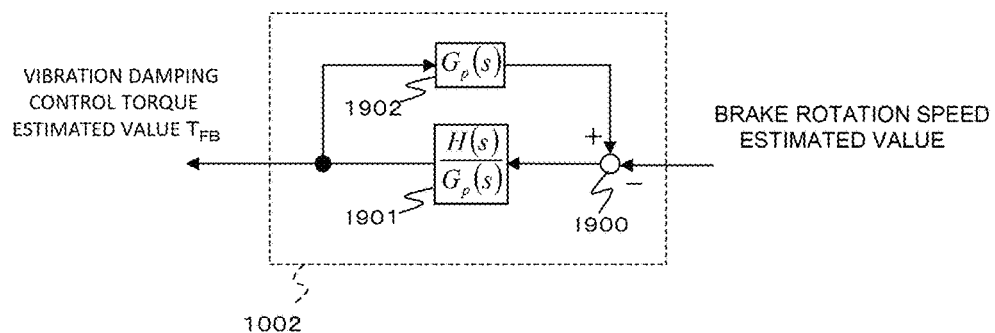
FIG. 19 is a diagram describing a method for calculating a vibration damping control torque estimated value in the control device for electric motor vehicle of the second embodiment.

FIG. 19 is a diagram describing the details of the vibration damping control (F/B compensator) process $G_{FB}(s)$ performed by the control block 1002. A control block 1901 is a filter having a transfer characteristic H(s)/Gp(s). As described above, Gp(s) is the model for the transfer characteristic from the torque input to the vehicle until the rotation speed of the motor. H(s) is a low-pass filter having such a transfer characteristic that a difference between the denominator degree and the numerator degree is equal to or more than a difference between the denominator degree and the numerator degree of the model Gp(s). A control block 1902 is a filter having the transfer characteristic Gp(s) and outputs a value obtained by inputting the output from the control block 1901 and performing the filtering process on the input value to a subtractor 1900. The subtractor 1900 subtracts the past value of the brake rotation speed estimated value from the value output from the control block 1902 to output the obtained value through the subtraction to the control block 1901. Accordingly, the vibration damping control torque estimated value $T_{F/B}$ on which the vibration damping control (F/B compensator) process has been performed can be calculated from the brake rotation speed estimated value.

It should be noted that, similar to the vibration damping control process in Step 203a in FIG. 13, the vibration damping control (F/B compensator) may be the vibration damping control described in JP2003-9566A or may be the vibration damping control described in JP2010-288332A.

Referring back to FIG. 18, the explanation will be continued. A control block 1003 performs the process of the transfer characteristic Gb(s) indicated in Equation (12) according to the braking amount B, the vibration damping control torque command value $T_{F/R}$, and the wheel speed ωm to calculate the brake rotation speed estimated value after the vibration damping control.

A control block 1004 performs the filtering process on the brake rotation speed estimated value after the vibration damping control by the filter having the transfer characteristic $H(s)/Gr(s)$, which is constituted of the low-pass filter $H(s)$ and the inverse system of the above-described $Gr(s)$, to calculate the brake torque estimated value. The calculated brake torque estimated value is output to the adder/subtractor 804 in FIG. 17 similar to the first embodiment to be added to a value obtained by subtracting the first motor torque estimated value from the second motor torque estimated value.

When the vibration damping technique, which reduces the torsional vibration of the drive shaft, is used, the second embodiment calculates the brake torque estimated value using the model of the transfer characteristic considering the vibration damping control. This allows accurately canceling the braking amount from the disturbance torque estimated value also in the case where the vibration damping control is used.

The present invention is not limited to the above-described embodiments but various modifications and applications are possible. For example, the above-described explanation describes that, when the accelerator operation amount is equal to or less than the predetermined value and the electric motor vehicle is just before the stop of the vehicle, the motor torque command value Tm* is converged to the corrected disturbance torque command value Td in conjunction with the reduction in the rotation speed of the electric motor 4. However, the speed parameters such as the wheel speed, the vehicle body speed, and the rotation speed of the drive shaft are proportional relationship with the rotation speed of the electric motor 4. Accordingly, the motor torque command value Tm* may be converged to the disturbance torque estimated value Td in conjunction with the reduction in speed parameter, which is proportionate to the rotation speed of the electric motor 4.

The invention claimed is:

1. A control device for electric motor vehicle using an electric motor as a traveling drive source and configured to decelerate by a regenerative braking force from the electric motor, the control device for electric motor vehicle comprising:
    one or more controllers configured to:
        detect an accelerator operation amount;
        calculate a disturbance torque estimated value based on disturbance factors;
        detect or estimate a braking amount to add a braking force, via friction brakes, to the electric motor vehicle;
        correct a disturbance torque estimated value according to the braking amount;
        calculate a motor torque command value; and
        control the electric motor on a basis of the motor torque command value, wherein
    the one or more controllers are configured to calculate a brake torque estimated value from the braking amount, and the one or more controllers are configured to correct the disturbance torque estimated value on a basis of the brake torque estimated value;
    when the accelerator operation amount is equal to or less than a predetermined value and the electric motor vehicle is just before a stop of the electric motor vehicle, the one or more controllers are configured to cause the motor torque command value to converge to the corrected disturbance torque estimated value in conjunction with a reduction of a speed parameter proportionate to a rotation speed of the electric motor.

2. The control device for electric motor vehicle according to claim 1, further comprising
    a fluid pressure sensor configured to detect a brake operation amount by a driver, wherein
    the braking amount is decided on a basis of the brake operation amount detected by the fluid pressure sensor.

3. The control device for electric motor vehicle according to claim 2, wherein
    the braking amount is decided on a basis of a command value regarding an operation of the friction brakes.

4. The control device for electric motor vehicle according to claim 2, wherein
    the braking amount is decided considering responsiveness from an input of the braking amount to the electric motor vehicle until the braking force acts on the electric motor vehicle.

5. The control device for electric motor vehicle according to claim 1, wherein
    the brake torque estimated value has different signs according to a traveling direction of the electric motor vehicle.

6. The control device for electric motor vehicle according to claim 1, wherein
    the one or more controllers are configured to calculate the brake torque estimated value using a filter including a model for a transfer characteristic $Gb(s)$ from an input of the braking amount to the electric motor vehicle proportionate to the rotation speed of the electric motor.

7. The control device for electric motor vehicle according to claim 6, wherein
    the one or more controllers are configured to calculate the brake torque estimated value additionally using a filter having a transfer characteristic $H(s)/Gp(s)$, the transfer characteristic $H(s)/Gp(s)$ being constituted of a low-pass filter $H(s)$ and an inverse system of a model for a transfer characteristic $Gp(s)$ from a torque input to the electric motor vehicle proportionate to the rotation speed of the electric motor.

8. The control device for electric motor vehicle according to claim 6, wherein
    when a vibration damping control to reduce a torsional vibration of a drive shaft is applied to the electric motor vehicle, the one or more controllers are configured to calculate the brake torque estimated value using the model for the transfer characteristic considering the vibration damping control.

9. A control method for electric motor vehicle using [a] an electric motor as a traveling drive source and configured to decelerate by a regenerative braking force from the electric motor, the control method for electric motor vehicle comprising:
    detecting, via one or more controllers, an accelerator operation amount;
    calculating, via the one or more controllers, a disturbance torque estimated value based on disturbance factors;
    detecting or estimating, via the one or more controllers, a braking amount to add a braking force, via friction brakes, to the electric motor vehicle;
    calculating, via the one or more controllers, a brake torque estimated value from the braking amount;
    correcting, via the one or more controllers, the disturbance torque estimated value according to the brake torque estimated value;
    calculating, via the one or more controllers, a motor torque command value converged to the corrected disturbance torque estimated value in conjunction with a reduction of a speed parameter proportionate to a rotation speed of the electric motor when the accelerator operation amount is equal to or less than a predetermined value and the electric motor vehicle is just before a stop of the electric motor vehicle; and controlling, via the one or more controllers, the electric motor on a basis of the motor torque command value.

* * * * *